C. A. PARSONS, S. S. COOK AND L. M. DOUGLAS.
GEARED TURBINE SYSTEM.
APPLICATION FILED SEPT. 4, 1920.
1,393,392. Patented Oct. 11, 1921.
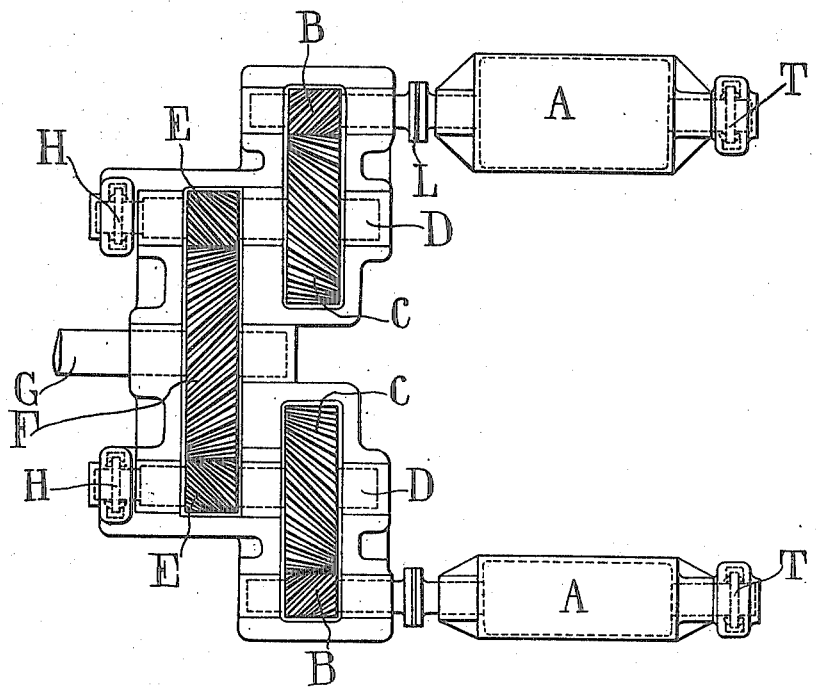
INVENTORS:
STANLEY S. COOK,
LOUIS M. DOUGLAS,
CHARLES A. PARSONS.
By Spear, Middleton, Donaldson & Hall
Attys.

UNITED STATES PATENT OFFICE.

CHARLES ALGERNON PARSONS, STANLEY SMITH COOK, AND LOUIS MORTIMER DOUGLAS, OF NEWCASTLE-UPON-TYNE, ENGLAND; SAID COOK AND SAID DOUGLAS ASSIGNORS TO SAID PARSONS.

GEARED TURBINE SYSTEM.

1,393,392.   Specification of Letters Patent.   Patented Oct. 11, 1921.

Application filed September 4, 1920. Serial No. 408,275.

*To all whom it may concern:*

Be it known that we, CHARLES ALGERNON PARSONS, STANLEY SMITH COOK, and LOUIS MORTIMER DOUGLAS, all subjects of the King of Great Britain, residents of Heaton Works, Newcastle-upon-Tyne, in the county of Northumberland, England, have invented certain new and useful Improvements in Geared Turbine Systems, of which the following is a specification.

The present invention relates to geared turbine systems in which one or more turbines transmit power through helical gear trains.

It has already been proposed in specification Serial No. 260,552 filed October 31st, 1918, that the steam thrust of a turbine or turbines shall be carried by double helical gears which the turbine operates. In many cases, however, it is necessary to provide balancing pistons in the turbine in order to reduce the steam thrust to such an amount as can be carried by the gears.

The object of the present invention is to construct the installation in such a manner that the necessity for balancing pistons is avoided.

The invention consists in a double reduction geared turbine installation in which the steam thrust of the turbine is partly taken up by a single helical pinion engaging with a single helical wheel and partly by a thrust block, while the secondary gears are also single helical, the intermediate shaft being provided with a thrust block, for retaining it in longitudinal position.

The invention further consists in the improved geared turbine installation hereinafter described.

The invention is illustrated by way of example in the accompanying drawing, in which the turbines A, A, which are shown as high pressure and low pressure turbines respectively, are rigidly coupled to the pinions B, B. The pinions B are single helical and the longitudinal components of the tooth pressures are arranged partly to balance the steam pressures, excess of end thrust being taken by the thrust blocks T, T, which are advantageously of the pivoted type. The pinions B, mesh with wheels C on the intermediate shafts D, and it will be seen that the forces on the teeth of the wheel C will produce an axial thrust on the intermediate shaft D. On the shafts D are secondary pinions E which mesh with a secondary wheel F mounted on the propeller shaft G. The difference between the thrust of the secondary pinion E and the primary wheel C is carried by the thrust block H on the intermediate shaft.

Astern turbines may be incorporated in any or all of the ahead turbine casings or separate astern turbines may be provided, and, if desired, these may drive their own pinions.

When the direction of rotation of a pinion is reversed, the axial components of the forces on the gear teeth are also reversed, and it is therefore necessary, in order to obtain approximately uniform distribution of pressure along the gear teeth, to have the direction of steam thrust on the astern turbines opposite to that of the ahead turbines.

In any of the foregoing arrangements, for convenience of adjustment a pad L may be provided between the coupling flanges of the pinions B and the rotor shafts.

Balance weights also may be provided on the intermediate shafts so arranged that tilting of the intermediate shafts is avoided when under varying loads, the forces acting in the upward direction become equal to the weight of the shaft, as described in the specification Serial No. 199,341 filed October 30th, 1917.

Having now described our invention, what we claim as new and desire to secure by Letters Patent is:—

In a double-reduction geared turbine installation, the combination of an axial-thrust turbine, a shaft driven thereby, a thrust-block co-acting with said shaft and taking a part of the thrust of said turbine, a single helical pinion mounted on said shaft, a main driven shaft, a single helical wheel mounted thereon, an intermediate shaft, a single helical pinion mounted on said intermediate shaft and gearing with said wheel on said main driven shaft, a single helical wheel mounted on said intermediate shaft gearing with said pinion on said turbine shaft and receiving the balance of the thrust of said turbine and a thrust-block co-acting with said intermediate shaft to receive the thrust thereof due to said single helical wheels mounted thereon.

In testimony whereof we have signed our names to this specification.

CHARLES ALGERNON PARSONS.
STANLEY SMITH COOK.
LOUIS MORTIMER DOUGLAS.